Aug. 26, 1924.
T. MIDGLEY
1,506,436
CORE HANDLING DEVICE
Filed Dec. 2, 1920
4 Sheets-Sheet 4
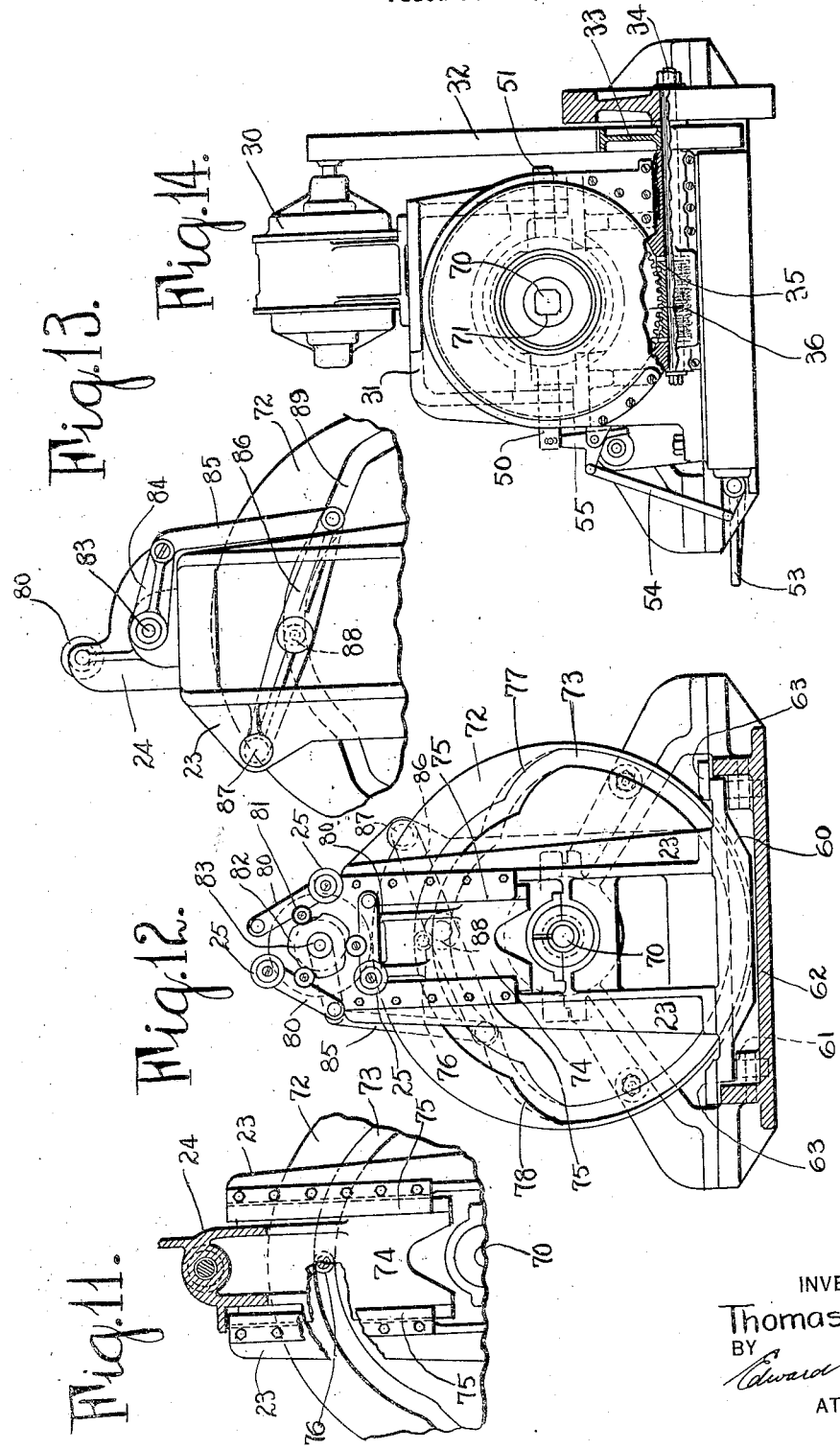
INVENTOR
Thomas Midgley
BY
Edward C. Taylor
ATTORNEY Patented Aug. 26, 1924.

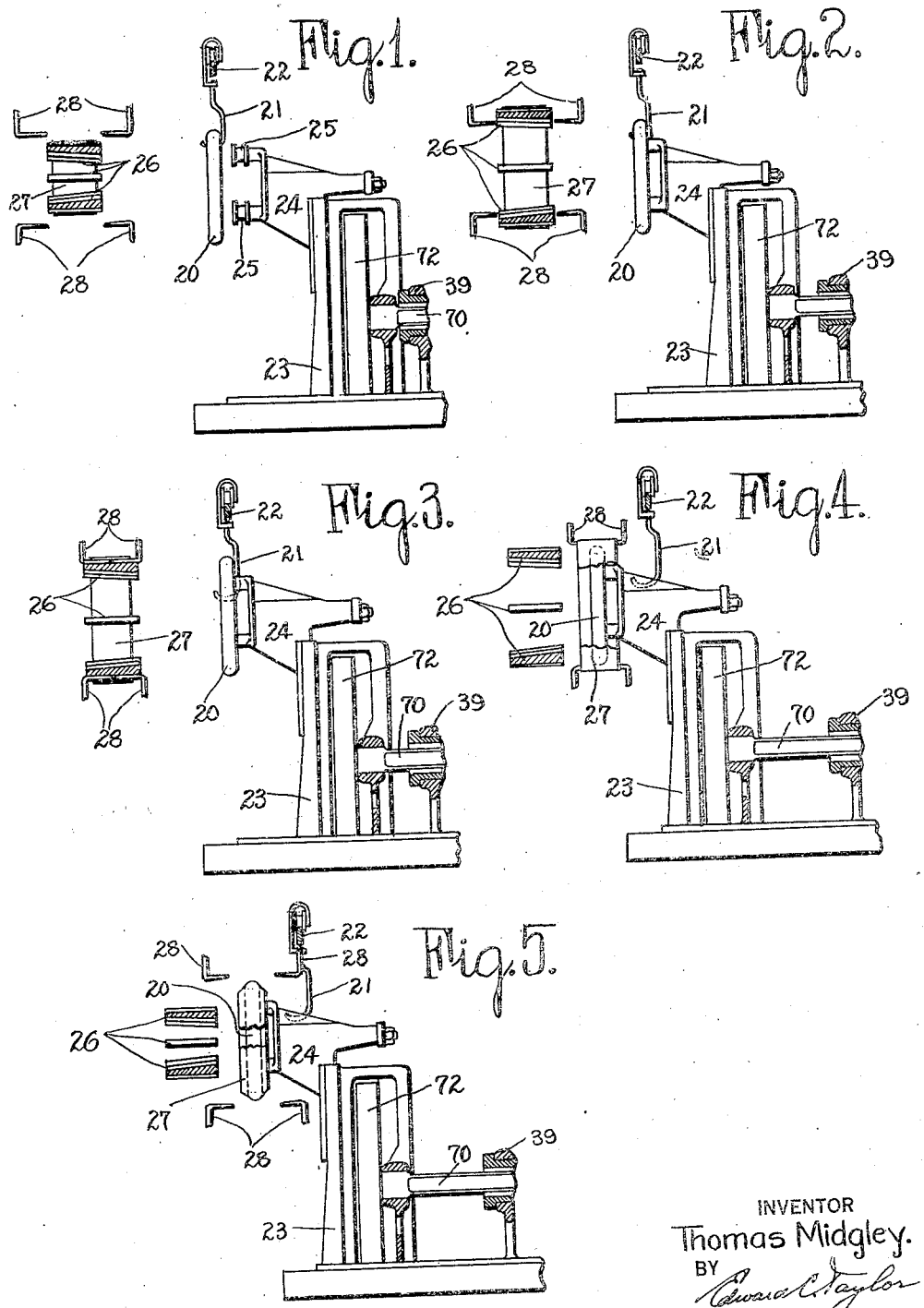

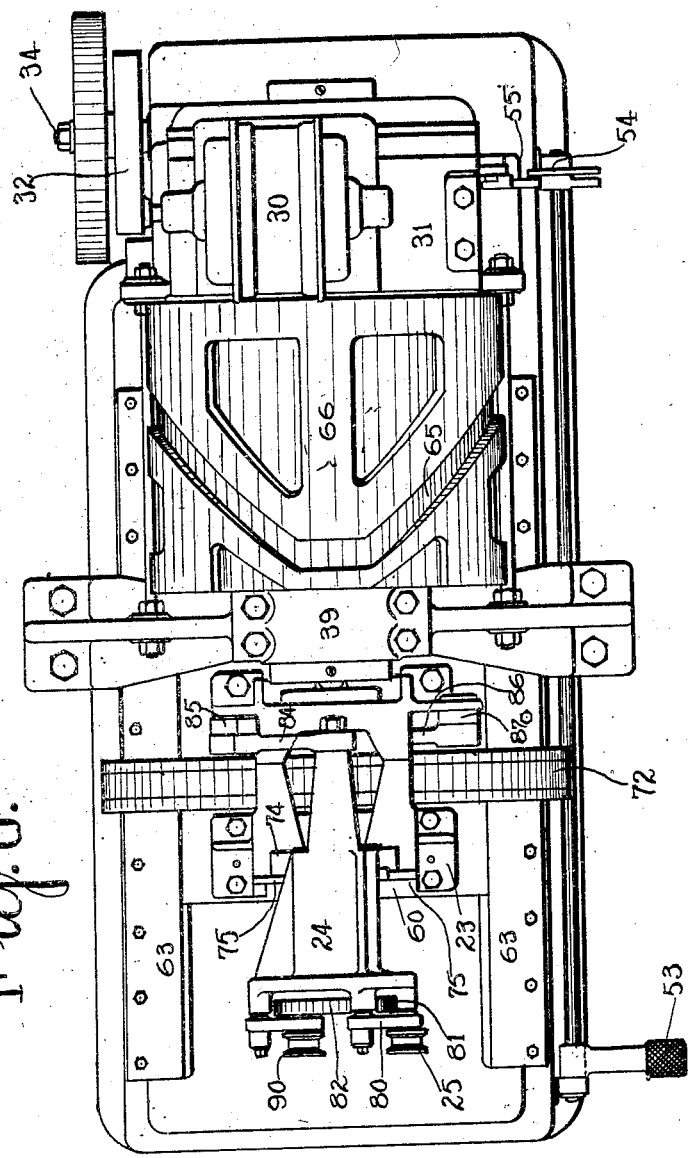

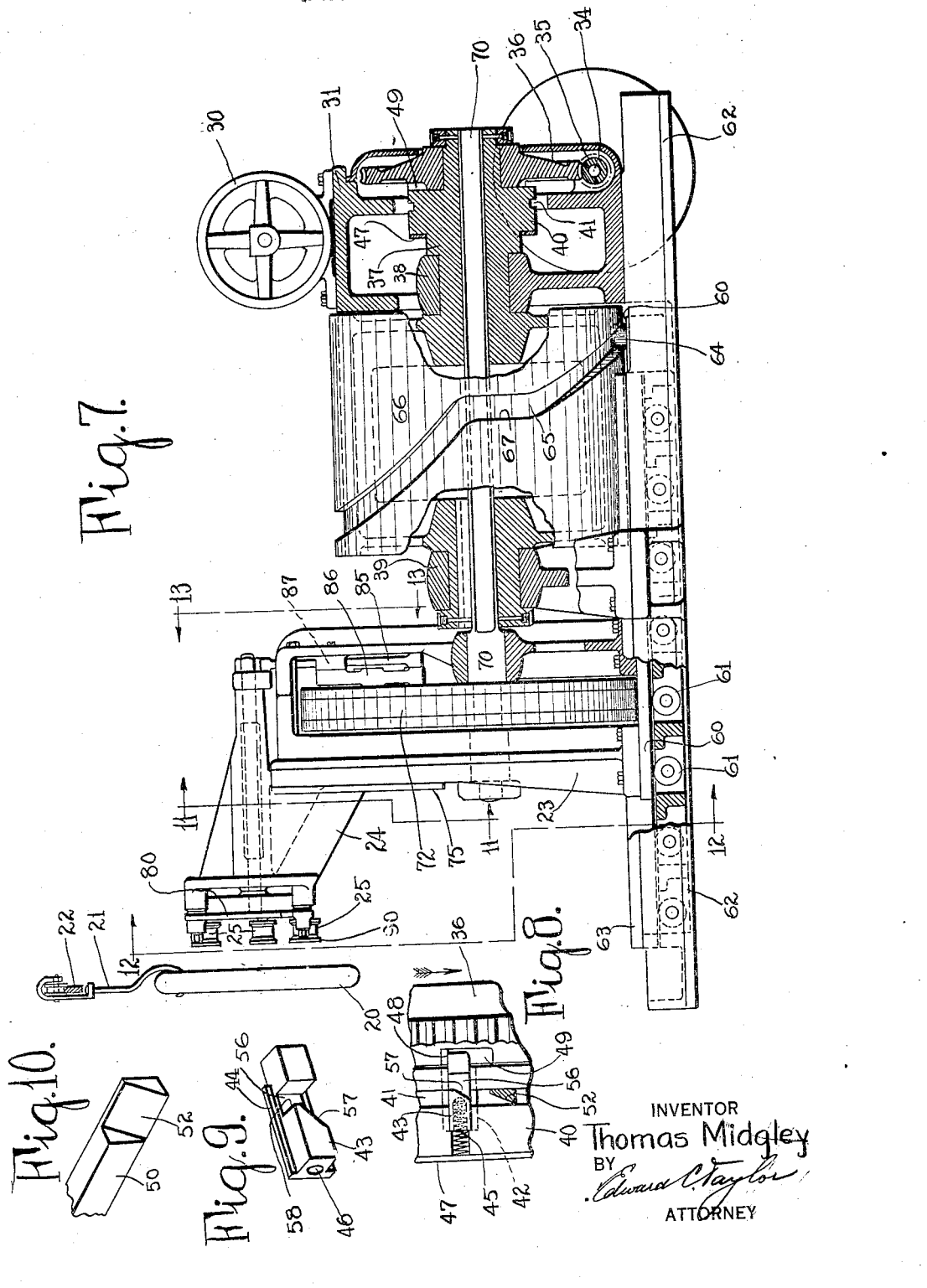

1,506,436

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

CORE-HANDLING DEVICE.

Application filed December 2, 1920. Serial No. 427,884.

*To all whom it may concern:*

Be it known that I, THOMAS MIDGLEY, a citizen of the United States of America, residing at Hampden, in the county of Hampden and State of Massachusetts, have invented certain new and useful Improvements in a Core-Handling Device, of which the following is a specification.

This invention relates to a machine for handling tire forming supports such as the annular cores used in the building of tire casings. It has for its object a machine adapted to be used in association with machines for performing building operations on the cores, and which will position the core for the operation of such building machines. The invention is directed in particular to a core handling machine adapted for cooperation with a conveying system for handling cores on overhead tracks.

The invention will now be described in detail with particular reference to the accompanying drawings, in which—

Figs. 1 to 5 inclusive are diagrammatic views showing the operation of the machine in removing a core from an overhead carrier and positioning it for the operation of tire building machine;

Fig. 6 is a plan view of the machine;

Fig. 7 is a side elevation, partly broken away;

Fig. 8 is a detail of a clutch;

Figs. 9 and 10 are details of clutch elements;

Fig. 11 is a section on line 11—11 of Fig. 7;

Fig. 12 is a section on line 12—12 of Fig. 7;

Fig. 13 is a detail on line 13—13 of Fig. 7; and

Fig. 14 is an elevation of the machine, partly broken away, looking from the right in Figs. 6 and 7.

Although in its broader aspects the machine is adaptable for use in positioning cores for many different purposes and under many different conditions, it will be described for convenience in connection with an overhead system of handling cores and as being used for the purpose of positioning cores for the operation of a machine which expands an endless band of fabric, positions it around a core, and permits it to contract thereon. Such a fabric positioning means is described in my application Serial No. 301,782 filed June 4, 1919, to which reference is made for a complete description of such machine and its method of operation.

Before considering the mechanical details of the machine, the general operation will be described with particular reference to Figs. 1 to 5. The preferred form of the machine shown is designed to operate on a core 20 supplied by a hook 21 of a usual type from an overhead track 22. The machine itself comprises a pedestal 23 which is reciprocated horizontally by mechanism to be described, and which carries a head 24 adapted to be reciprocated vertically by another mechanism which will be described. The head 24 supports a core grasping mechanism comprising a series of core holding rollers 25 which are movable into and out of core holding position at the proper time.

The tire building machine which is shown as cooperating with the core handling device comprises a circumferential series of expanding fingers 26 adapted to receive a band of fabric 27 and expand it from a diameter smaller than (Fig. 1) to a diameter greater than (Fig. 2) the diameter of the core at its crest. A series of carrying fingers 28 close together (Fig. 3) after the expanding fingers have stretched the band, and carry it to a position (Fig. 4) where they can release it upon the core without interference from the expanding fingers. After they have moved to this position the carrier fingers separate (Fig. 5), thus releasing the band, and then move back to receive a new band from the expanding fingers.

The core handling device operates in conjunction with an overhead conveying system and a tire building machine in the following manner. Starting with Fig. 1, the device is in what may be termed its normal or inactive position. It will be noted that core holding rollers 25 are substantially centrally disposed with relation to the core as the latter is supported from the overhead conveyor. The next operation, shown in Fig. 2, is a motion towards the core by pedestal 23 and the elements mounted thereon. After the core holding rollers are inserted within the inner circumference of the core by this motion they are expanded by a suitable mechanism so that they grasp the core firmly and hold it in a centered position. The head 24 now rises into the position of Fig. 3, thereby lifting the core off its supporting hook and freeing it so that it can later be moved into operative position with respect to the tire building apparatus, or so that the hook may readily be disengaged from the core, if it is not desired to move the latter. In Fig. 3 the tire building machine is shown with the carrying fingers just about to remove the expanded band from the expanding fingers. The next operation of the core handling device is a motion forward of pedestal 23, carrying the core within the range or operation of the tire building machine, as shown in Fig. 4. This figure also shows the carrying fingers of the building machine in the position they occupy after they have removed the band from the expanding fingers and just before they separate to release the band upon the core. The releasing operation is shown in Fig. 5, the core handling device being in the same position as in Fig. 4. After all the desired operations have been performed on the core at this station, the core handling device reverses the sequence of its operations, going successively through the positions of Figs. 3, 2, and 1, repositioning the core upon the hook.

Main drive (Figs. 6, 7, and 14).

The device is driven from a motor 30 supported upon a frame 31, and connected by a chain 32 with a sprocket 33 on a transverse shaft 34. A worm 35 on this shaft drives a worm gear 36 journaled for rotation upon a sleeve 37 which is itself journaled in bearings 38 and 39. The sleeve 37 is driven intermittently from worm gear 36 by a clutch mechanism which is under the control of the operator. This clutch mechanism will now be described.

Clutch mechanism (Figs. 6, 7, 8, 9, 10 and 14).

Integral with, or otherwise attached to sleeve 37 is a cylindrical portion 40 having a circumferential groove 41 and two diametrically opposed axial grooves 42 (only one of these appearing in the drawings). Sliding in each groove 42 is a dog 43 having a dovetailed portion 44 which fits in a corresponding dovetail in groove 42. This dog is spring pressed towards worm wheel 36 by a spring 45 seating in a recess 46 in one end of dog 43 and abutting against a plate 47 secured in any suitable way to one end of cylindrical portion 40. If springs 45 are allowed to operate the dogs will be pressed into the path of abutments 48 secured to the face of worm wheel 36, this face having recesses 49 to permit of such engagement. In this position worm wheel 36 and sleeve 37 are coupled together for rotation.

The clutch is designed to permit of the mechanism being started at the will of the operator, but to stop only at the end of a half cycle, that is, with the core grasping rollers either in the inactive position of Fig. 1 or in that of Figs. 4 and 5 in which the core is positioned for the operation of an additional mechanism such as a tire building machine. To this end two cam fingers 50 and 51 are provided having wedge shaped ends 52. Finger 51 is permanently mounted (Fig. 14) so as to project at all times into the circumferential groove 41 referred to above. Finger 50, however, may be projected into or withdrawn from groove 41 by a treadle 53 acting through a link 54 and a bell crank 55, preferably spring pressed so that the treadle will normally stay in its raised position. To coact with the wedge shaped ends 52 of fingers 50 and 51 dogs 43 have slots 56 one side of which have wedge shaped portions 57 for a portion of their lengths. If the wedge 52 is projected into groove 41 it will contact with the wedge portion 57 of the dog when the rotation of the worm wheel brings the latter into engaging position. As this contact continues the dog will be withdrawn gradually from engagement with abutment 48 until the driving connection between the worm wheel 36 and sleeve 38 is entirely broken. At this point the rear edge of the finger will ride up on a flattened portion 58 of the slot 56. Rotation of the sleeve ceasing, the dog will be held out of engagement with the worm wheel until the finger is withdrawn so that the spring 45 can force the dog forward again.

The purpose of having two dog engaging fingers 50 and 51 can now be described. As stated above, the clutch is intended to stop the machine only at the half cycle points. Considering first the position of the clutch mechanism when the machine is at rest, one of the clutch dogs is held out of operation by the stationary dog engaging finger 51 and the other by the movable finger 50, which at this time is in its innermost position. It will be understood that the worm wheel 36 is constantly rotating. If now the treadle 53 is pressed, finger 50 will be withdrawn from engagement with the dog, permitting the dog to be projected into the path of the next abutment 48 to come by. The dog diametrically opposite will be carried by the rotation of the sleeve 37 out of contact with finger 51. If the operator now releases the treadle, finger 50 will be in position to engage the dog which has just passed finger 51, and will withdraw this from contact with the worm wheel at the same time that the other dog is withdrawn by finger 51.

It will be seen from the above description that the clutch will operate to carry the mechanism through a half cycle at each depression of the treadle. Preferably the points at which the mechanism is automatically stopped by the clutch are those illustrated by Figs. 1 and 4, the first stoppage permitting cores being moved to or out of position on the overhead track and the second stoppage permitting the operation of the tire building or other machine with which the core handling device is intended for cooperation.

*Pedestal reciprocating mechanism (Figs. 6, 7 and 12).*

Pedestal 23 is mounted upon a slide 60 reciprocable over rollers 61 journaled in the base 62, plates 63 serving to cover the edges of the slide. At its rear end slide 60 carries a cam roll 64 running in a cam groove 65 on a drum 66 secured to sleeve 37. By the rotation of this sleeve, and consequently of the cam drum, the pedestal will be reciprocated from the position of Fig. 1 to that of Fig. 4, with a short dwell at a position corresponding to Figs. 2 and 3 while the core is being grasped and raised off the hook by mechanism which will later be described. The cam groove 65 has a flat space 67 which causes this dwell. After this cycle of operations the drum is stopped by the clutch and the desired operation performed upon the core by whatever cooperating mechanism may be used. As the clutch is again rendered active by depression of treadle 53 the cam drum will rotate through another half revolution, carrying the pedestal slide back to the position of Figs. 1 and 7. In Figs. 1 to 5 a portion of bearing 39 has been shown as a reference point by which the various positions of the slide can be compared.

*Head elevating mechanism (Figs. 7, 11, and 12).*

Journaled in pedestal 23 is a shaft 70 which is squared as at 71 (Fig. 14) and passes loosely through a squared hole in sleeve 37, whereby it is free to reciprocate through the sleeve but is constrained to rotate therewith. Rotatable with this shaft and carried in pedestal 23 is a cam wheel 72 carrying on its forward face a cam groove 73. A slide 74, carrying head 24 previously referred to, is mounted for vertical reciprocation in guides 75 on pedestal 23. On the back side of the slide is a cam roll 76 running in groove 73. As the cam wheel is rotated the slide will be moved only at two places, corresponding points in the groove being indicated at 77 and 78. These points cause the vertical movement of the head between the positions of Figs. 2 and 3, and the converse movement on the return sequence of movements. The time when the upward movement takes place is just after the core is grasped by the rollers 25, and is substantially during the intermediate period of dwell in the horizontal reciprocation of the pedestal 23.

*Core grasping mechanism (Figs. 6, 7, 12, and 13).*

The apparatus for grasping the core and holding it while it is being operated upon comprises a plurality of rollers 25, three in number as shown, mounted on one end of arms 80 pivoted on head 24. These rollers are preferably pivotally mounted so that, if desired, the core may be rotated during the action of whatever the additional mechanism may be used. Each arm carries intermediate its length a cam roll 81 coacting with a cam 82 carried by a shaft 83 journaled in the head. On the rear end of this shaft is an arm 84 connected by a link 85 with a lever 86 pivoted at 87 to pedestal 23. Lever 86 carries a cam roll 88 running in a cam groove 89 in the rear face of cam wheel 72. This cam groove is so shaped as to cause the link and lever mechanism described above to rotate cam 82 to move rollers 25 outwardly after the pedestal has been moved into the position of Fig. 2 and before the vertical motion of the head takes place; and to rotate the cam to move the rollers inwardly when the position of Fig. 2 has been reached in the return cycle of movements. Preferably the rollers 25 are provided with tapering flanges 90 so that the core will be accurately centered as the rollers are moved outwardly.

*Conclusion.*

It is thought that the operation of the device will be clear from the foregoing and therefore it will not be described again at this point. It will be apparent that changes in the mechanical elements by which the novel functions of my device are accomplished may be varied without departing from the invention, and I therefore do not wish to be limited in scope except as specifically pointed out in the following claims. In particular it will be apparent that various elements of the machine may be used separately, or may have slightly different modes of operation from the preferred form which is described.

Having thus described my invention, I claim:

1. A core handling device comprising a support, means for reciprocating the support horizontally, a head vertically movable in that support, means for causing vertical reciprocation of the head, core grasping elements mounted on said head, and means for expanding said elements to cause them to grasp a core.

2. A core handling device comprising a support, a rotatable cam engaging with said support for reciprocating it horizontally, a cam carried by said support and connected to the first-mentioned cam whereby they are rotatable together in all positions of the support, a head vertically slidable on said support and engaging with the second-named cam whereby it is reciprocated vertically, a plurality of outwardly and inwardly movable core supporting elements on said head, and connections between the second-named cam and said elements whereby they are moved outwardly and inwardly.

3. A tire building apparatus comprising a conveyor for tire forming supports, means to apply material to such supports; mechanism operable to take a support from the conveyor, position it for the operation of the material applying means, and reposition it upon the conveyor; and controlling means for said mechanism to cause it automatically to stop with the support in material applying position.

4. In combination, a conveyor for a series of tire building cores, a tire building machine, a device arranged adjacent the conveyor to handle successive cores, means to operate said device for successively presenting the cores from the conveyor to the tire building machine and returning them to the conveyor in a fixed time for each of said movements of the core from and to said conveyor.

5. A tire core handling device comprising means to grasp a core by its inner periphery, means permitting rotation of the core while held by said grasping means, and mechanism for automatically moving the core grasping means in a predetermined path, whereby the core is grasped, raised to clear it from its original support, positioned for the operation of additional mechanism, replaced on a support, and released.

6. A core handling apparatus comprising a support, means for reciprocating the support horizontally, a core grasping device carried by the support, means for reciprocating the core grasping device vertically, and means for operating the core grasping device to grasp or release a core.

7. A core handling apparatus comprising a support, means for reciprocating the support horizontally, a core grasping device carried by the support, means for reciprocating the core grasping device vertically, means for operating the core grasping device to grasp or release a core, and driving mechanism for automatically operating said several means in sequence to grasp a core, raise it to free it from a supporting device on which it is brought to the apparatus, position it for the operating of additional mechanism, replace it upon a supporting device, and release it.

8. A core handling apparatus comprising a support, means for reciprocating the support horizontally, a core grasping device carried by the support, means for reciprocating the core grasping device vertically, means for operating the core grasping device to grasp or release a core, and driving mechanism for automatically operating said several means in sequence to grasp a core, raise it to free it from a supporting device on which it is brought to the apparatus, position it for the operating of additional mechanism, replace it upon a supporting device, and release it, said grasping device forming the holder for the core during the operation of such additional mechanism.

THOMAS MIDGLEY.